March 19, 1957 M. ALDEN 2,785,942
RECORDER
Filed March 20, 1951 3 Sheets-Sheet 1

Inventor
Milton Alden
by Roberts, Cushman & Groves
Att·ys

March 19, 1957 M. ALDEN 2,785,942
RECORDER
Filed March 20, 1951 3 Sheets-Sheet 2

Inventor
Milton Alden
by Roberts, Cushman & Grover
att'ys

March 19, 1957  M. ALDEN  2,785,942
RECORDER

Filed March 20, 1951  3 Sheets-Sheet 3

Inventor
Milton Alden
by Roberts, Cushman & Grover
Attys

United States Patent Office 2,785,942
Patented Mar. 19, 1957

2,785,942

RECORDER

Milton Alden, Wellesley, Mass.

Application March 20, 1951, Serial No. 216,625

9 Claims. (Cl. 346—74)

This invention relates to recorders and more particularly to recorders which record upon a tape or strip of sheet material.

Objects of this invention are to provide a recorder which is simple and economical in construction and operation, which is small in size and light in weight, which requires a minimum of maintenance, which is substantially hermetically sealed to exclude dust, fumes, water and the like and to seal in the moisture in the recording paper, which prevents tampering with the copy, which requires a minimum of auxiliary equipment, which can be adapted to continuous or intermittent operation, which is readily reloaded with recording tape with a minimum of threading required, and which advances the recording art generally.

The present invention contemplates in a broad aspect a recorder comprising a substantially air tight casing forming a hermetically sealed compartment wherein are carried recording means which are preferably one or more styli and an associated electrode although it is to be understood that other well known recording elements such as rotating conducting helix and parallel mounted bar electrode can be used. Rotatably mounted within the casing compartment are two similar interchangeable reels one of which carries a supply of recording material such as a strip or tape of electrosensitive material. The other reel acts as a takeup for the used tape. Tape feeding means, which can act either upon the strip or the takeup reel, transfer the tape from the supply reel past the recording means and thence to the takeup reel.

In another aspect the feeding means is located outside the casing and is provided with a shaft or other element which extends into the compartment to rotate the takeup reel. In continuously operating recorders tape feeding means such as a motor, which is either electrically or spring driven, is provided with a suitable gear reduction unit. In intermittently operating recorders, the feeding means is an escapement located either within or without the casing which is actuated by the occurrence of an input signal pulse to advance the takeup reel.

In a more specific aspect the stylus electrode includes an arm of elastic conducting material which yieldably urges a rotatable disc attached to one end thereof towards an associated electrode which is preferably in the form of an anvil. The other end of the arm is detachably attached either directly to the casing or to a removable insert in the casing. The anvil is preferably provided with a knife edge over which the tape is stretched by means of two guides one of which is located on either side of the anvil below the knife edge. When an insert is used for mounting the stylus electrode, the guides and anvil are also carried thereupon so that the entire recording assembly can be removed and replaced as a unit.

In another aspect switch means are provided which are periodically operated by the takeup reel so as to provide a calibration signal which can be applied to one of the stylus electrodes.

These and other objects and aspects will be apparent from the following description of several specific embodiments of the invention referring to drawings wherein Fig. 1 is an elevation view of one embodiment of the invention with portions of the casing broken away;

Figure 1:
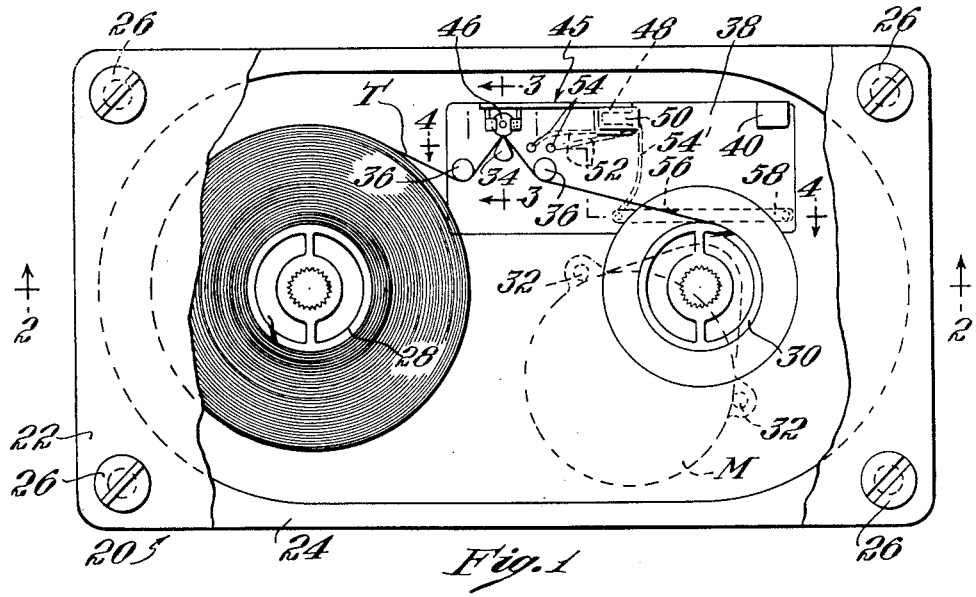
Figure 2:
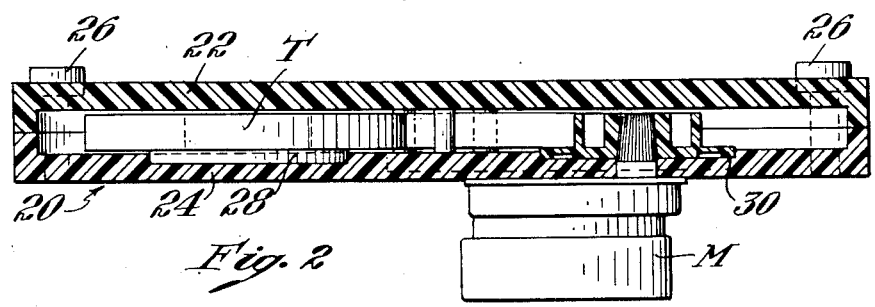
Fig. 2 is a sectional view on line 2—2 of Fig. 1.

The first embodiment of the invention chosen for the purpose of illustration comprises, as is best shown in Figs. 1 and 2, a casing 20 consisting of two recessed plates 22 and 24 of a nonconducting material such as a suitable plastic which plates are fastened together by means of four cap screws 26 so that the recesses in the casing portions form a substantially air tight compartment wherein is enclosed the recording mechanism.

Rotatably arranged in spaced relationship within the casing compartment are two similar reels, one of which is designated 28, being a magazine for holding a supply of electrosensitive tape such as the strip of electrolytic recording paper T. The other reel 30 is used as a takeup spool for receiving the tape T after it passes through the recording electrodes as will be described in detail below. The reels 28 and 30 are maintained in their spaced relationship by means of their respective flanges which engage circular recesses in the wall of the back casing plate 24 as is best shown in Fig. 2. The outer end of the body of each reel bears against the wall of the front casing plate 22 to prevent the flanges from disengaging from the respective circular recesses. As can further be seen in Fig. 2 the flange of the takeup spool 30 seats in its circular recess so as to seal off the opening through which the splined motor shaft described below extends, which sealing action is effective if the motor and shaft are detached from the casing.

The takeup reel 30 is also the driven member for transferring the tape T from the supply reel 28, and to this end a slow speed timing motor M, which is preferably of conventional design wherein is incorporated a speed reduction unit, is secured to the outer surface of the wall of the back casing plate 24 by means of screws 32 so that its splined shaft extends through an aperture in the casing wall to engage the mating female splined hole in the body of the takeup reel 30.

Figure 4:
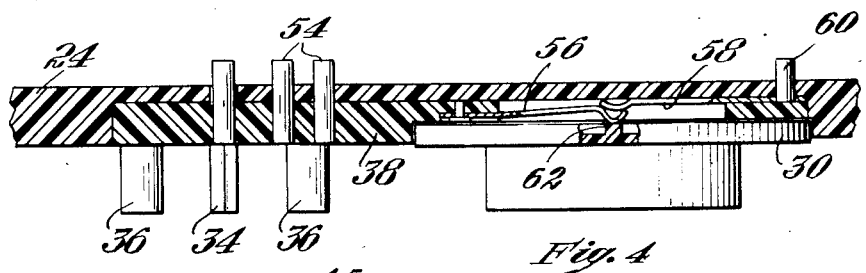
Fig. 4 is an enlarged partial sectional view on line 4—4 of Fig. 1.
Figure 3:
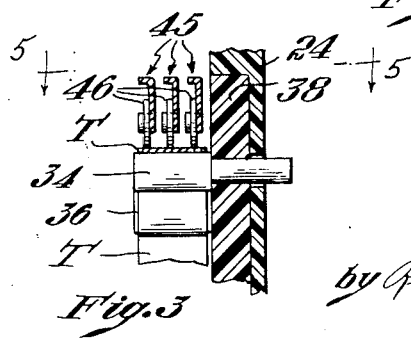
Fig. 3 is an enlarged fragmentary sectional view on line 3—3 of Fig. 1.

As the tape T is transferred from the supply reel 28 to the takeup reel 30, it passes over the knife edge of an anvil 34 which serves as the negative polarity recording electrode. To keep the tape T taut over the anvil knife edge the tape is passed under two guides 36 positioned on either side of the anvil 34 below the knife edge. The guides 36 are preferably molded integrally with an insert plate 38 wherein the anvil 34 is molded. The insert plate 38 is held in a recess in the back plate 24 as is best shown in Fig. 4 by means of a spacer 40 (Fig. 1) and the ends of the guides 36 which bear against the inner surface of the front plate 22. The anvil 34 is provided with a cylindrical contact pin which protrudes out through a hole in the wall of the back plate to form a bayonet for engaging a female electrical connector (not shown) for completing the common electrical portion to several recording circuits as will be described in detail below.

Figure 6:
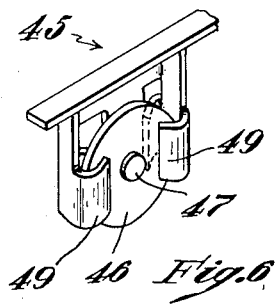
Fig. 6 is a fragmentary isometric view showing the details of construction of the recording end of a stylus.

The positive side of the recording circuits is completed through two styli 45, the third stylus being used in a calibration circuit as will be described in detail hereinafter. Although tipped styli operate satisfactorily in a recorder of the present type, their life is limited and a stylus having a disc 46 at the end of the stylus arm so that the effective recording point is continuously changed as the tape T moves is preferred. As is shown in Fig. 6, the stylus disc 46 is rotatably mounted upon a stud 47 extending from the stylus support 45, being held upon the stud by means of two opposed bent over tabs 49.

The opposite end of the stylus support 45 is bifurcated as at 48 (Fig. 1) to engage a corresponding groove in an integrally molded boss 50 which projects from the front of the insert plate 38. The electrical circuit to each of the styli 45 is made through contact with a conductor molded in the bottom of the corresponding groove in the boss 50, an arrangement which permits the stylus to be removed by simply disengaging the bifurcated portion 48 from its groove. Two of the contact making conductors 52 are molded in the insert plate 38 to connect with pins 54 which are located near the pin portion of the anvil 34 and project through corresponding holes in the back plate 24 in a similar manner so that all three pins can engage sockets in a single female connector. The third stylus 45 is connected by means of a conductor 54' with a flexible leaf spring 56 carrying a normally open contact at the free end thereof. The correlated stationary contact member 58 is molded in the bottom of the insert plate 38 being connected to an external direct power supply such as a battery (not shown) by means of a pin 60. The other side of the power supply is connected to the anvil 34 through its protruding pin so that as the contacts are closed, as described below, a calibrating circuit is completed which causes a current to flow through the tape to make a mark thereupon in the well known manner.

Figure 9:
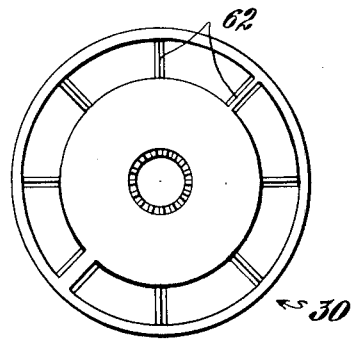
Fig. 9 is an enlarged detail view of the back of one of the reels.
Figure 5:
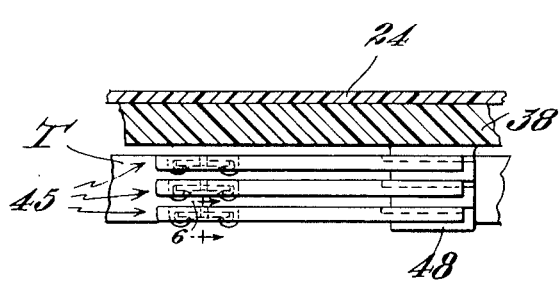
Fig. 5 is an enlarged partial sectional view on line 5—5 of Fig. 3.

As is best shown in Fig. 4, the contacts are moved into engagement by the rotation of the takeup reel 30. To this end, the back face of the flange of the reel is provided with eight recesses (Fig. 9) separated from each other by the equally spaced cam ribs 62 which engage the end of the movable contact 56 periodically to move the contact into engagement with the stationary contact 58. The record made upon the tape by the resulting current flow serves as a calibration for the tape which gives the correction for the record required to compensate for variations in the rate of feed of the tape due to any changes in the speed of the motor M and the changing effective diameter of the takeup reel 30 as the tape winds thereupon.

Figure 7:
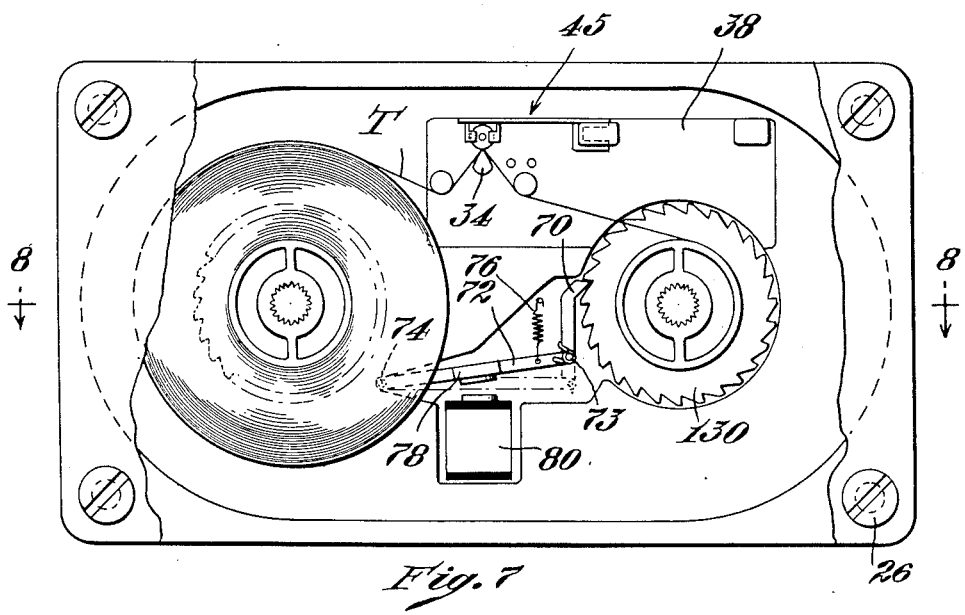
Fig. 7 is a side elevation view with parts broken away of a second embodiment of the invention.
Figure 8:
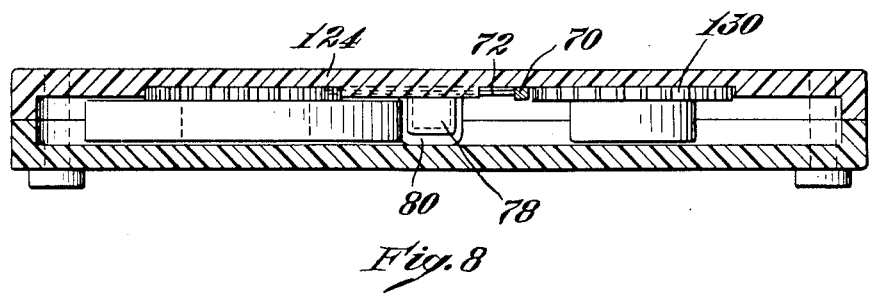
Fig. 8 is a sectional view on line 8—8 of Fig. 7.
Figure 15:
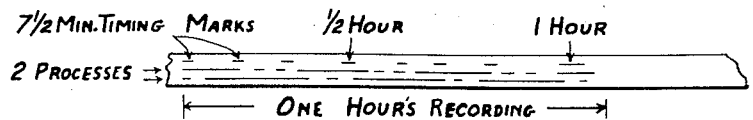
Fig. 15 is a view of a typical tape recording.

A second embodiment of the invention is shown in Figs. 7 and 8 wherein the driving means for the takeup reel is a pawl and ratchet arrangement to give an intermittent movement to the tape T. To this end the periphery of the flange of the takeup reel 30 is provided with a series of equally spaced indentations or teeth where they are engaged by one end of a pawl 70 whose opposite end is pivotally connected to the free end of a lever 72. A spring 73 biases the pawl 70 into engagement with reel teeth. The opposite end of the lever 72 is pivotally attached to the back plate 124 as at 74, a helical spring 76 normally maintaining the lever 72 and the pawl 70 in the raised position illustrated in Fig. 7. Extending outwardly from a position intermediate the ends of the lever 72 is an armature 78 for an electromagnet 80 which when energized pulls the lever downwardly against the force of the spring 76 to cock the pawl 70. Upon deenergization of the electromagnet 80 the energy stored in the spring 76 lifts the pawl 70 to advance the takeup reel 130 by one notch or tooth thus advancing the tape T through the recording elements.

The above described feed mechanism is particularly advantageous where the recorder is used simply as a counter which records only the total number of input signal pulses received without regard as to their timing. This is readily accomplished by connecting the electromagnet so that it is energized by the input signal, amplified if necessary. Upon the receiving of an input signal pulse, the energization of the electromagnet 80 and the recording of the tape T by the electrodes 34 and 45 take place simultaneously. After the termination of the signal pulse, the spring 76 advances the tape as described heretofore so that the recorder is ready to record the next input signal pulse. It will be evident that the above described intermittent feed will result in great saving of recording paper and will increase the length of the periods between servicing of the recorder when the input signal pulses are separated by long periods of time such as hours or days.

The operation of the above described recorders requires a minimum of auxiliary equipment and when used as a counter or monitor, the electrodes 34 and 45 are connected in series with a rectifier and one or more voltage reducing resistors across a conventional alternating current source. Interruption or making of the above circuit by the variable factor being recorded supplies the signal to the electrodes. The same power source is used to energize the motor M or the electromagnet 80 as the case may be.

The recorder is loaded by removing the screws 26 to separate the halves of the casing 20. The tip of the tape T from a new supply reel 28 is attached to the takeup reel 30, as described below, and both reels dropped into the circular recesses in the back plate, the tape being threaded between the anvil 34 and the styli 45 by lifting the styli. The front plate is then fastened in place by the screws 26 which substantially hermetically seals the casing so that the tape remains moist for long periods of time.

Figure 11:
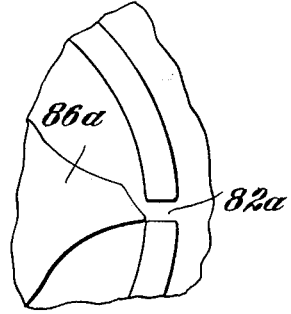
Fig. 11 is an enlarged fragmentary view showing an alternative reel construction.
Figure 10:
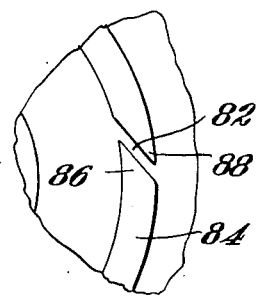
Fig. 10 is an enlarged fragmentary view showing the detail of the slot in the reel.

The details of the construction of the slot 82 in the reel 30 is shown in Fig. 10 wherein the slot is disposed in the hub of rim 84 at an acute angle to a tangent to the rim. This angle is correlated with respect to the width of the slot so that as the tape T is radially inserted to strike the inner lip 86 and is deflected to the position illustrated wherein it is snubbed around the outer lip 88. This arrangement permits easy insertion of the tape and at the same time results in a secure locking action because of the snubbing effect. A similar action is obtainable with a radially disposed slot 82a (Fig. 11) such as is shown in Fig. 11 by providing an abutment such as the boss 86a to deflect the tape T to the position shown.

Figures 12, 13:
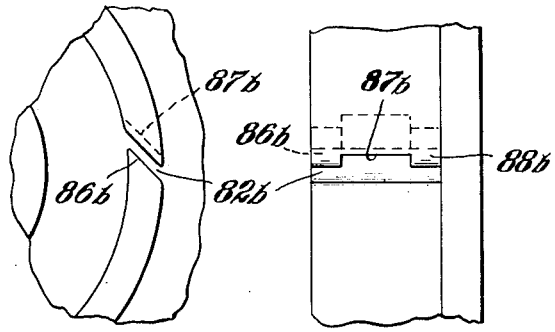
Figs. 12 and 13 are enlarged fragmentary views showing the details of a slot giving a positive lock.
Figure 14:
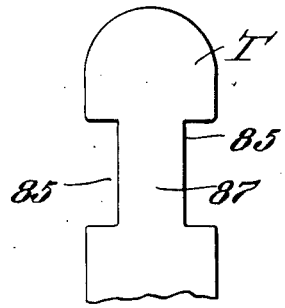
Fig. 14 is a view showing a tape notched to be used with the slot illustrated in Figs. 12 and 13.

In Figs. 12 and 13 is shown a type of angularly disposed slot 82b for positively locking the end of the tape which is provided with two oppositely disposed rectangular notches 85 cut respectively in either side of the tape near the end thereof to form a neck 87 as is shown in Fig. 14. As the end of the tape is inserted in the slot 82b so that its lip contacts the inner lip 86b, the lip deflects the tip in a manner similar to that described in detail heretofore. As a reverse pull is put on the tape, the neck 87 engages a groove 87b (Fig. 12) so that the end or tongue portion of the tape is positively locked by the inner side of the outer lip.

It should be understood that the present disclosure is for the purpose of illustration only and that this invention includes all modifications and equivalents which fall within the scope of the appended claims.

I claim:

1. A recorder comprising a casing forming a substantially closed compartment having a removable insert, recording means including a stylus electrode and an associated anvil electrode mounted in juxtaposed relationship upon said insert, connector means mounted upon said insert so as to extend out through the casing for completing an auxiliary electrical circuit to the electrodes so that the circuit can be readily interrupted and the electrodes and insert removed from the casing as an assembly, two reels rotatably mounted in said casing upon opposite sides of the recording means, one of which reels holds a supply of electrosensitive tape, the other reel serving as a takeup reel, and tape feeding means secured to the casing for rotating the takeup reel thereby to transfer the paper from the supply reel, between electrodes and thence to the takeup reel.

2. In the art of recording apparatus operated by a motor and for marking electrosensitive tape, a magazine comprising a casing forming a substantially closed compartment, a removable insert in said compartment, cooperative recording electrodes mounted in juxtaposed relation on said insert, connector means mounted upon said insert so as to extend outside said casing for completing an auxiliary circuit to the electrodes so that the circuit can be readily interrupted and the electrodes and insert removed from the casing as an assembly, two reels respectively for holding a supply of tape and for feeding the tape past said electrodes, and means for coupling said motor to the feeding reel.

3. In the art of motor operated recording apparatus for marking electrosensitive tape, a magazine comprising a casing having opposed inner walls and forming a substantially closed compartment, cooperative recording electrodes, a removable insert member in said compartment including means for mounting said electrodes in juxtaposed relation on said insert, so that said electrodes and insert member may be removed from the casing as an assembly, two reel members respectively for holding a supply of tape and for feeding the tape past said electrodes, means laterally engaging at least one of said members to position it in the compartment, said inner walls being spaced substantially the depth of said one member to hold said one member in engagement with said engaging means.

4. In the art of motor operated recording apparatus for marking electrosensitive tape, a magazine comprising a casing forming a substantially closed compartment, a removable insert in said compartment, cooperative recording electrodes mounted in juxtaposed relation on said insert including a plurality of independent electrodes and a common electrode, connector means mounted upon said insert so as to extend outside said casing for completing an auxiliary circuit to one of the independent electrodes so that the circuit can be readily interrupted and the electrodes and insert removed from the casing as an assembly, two reels respectively for holding a supply of tape and for feeding the tape past said electrodes, switch means including a resilient contact member carried by said insert and connected in series with another of said independent electrodes, and means on one of said reels periodically actuating said contact member thereby causing said other electrode to mark time intervals on the tape as it is fed by said electrodes.

5. In motor operated recording apparatus for marking electrosensitive tape, a detachable magazine comprising opposed separable cover plates having opposed inner walls and forming a substantially closed compartment, recording means carried in said compartment, two flanged reels respectively for holding a supply of tape and for taking up and feeding the tape past said recording means, the inner wall of one of said plates having circular recesses for receiving the reel flanges to position the reels in the compartment, said inner walls being spaced substantially the depth of said reels to confine the flanges in said recesses, angularly spaced cam means on said takeup reel, switch means periodically operated by said cam means as said reel is rotated, and connections between said switch means and recording means causing the recording means to mark time intervals on the tape as the tape is fed thereby.

6. In the art of motor operated recording apparatus for marking electrosensitive tape, a magazine comprising a casing forming a substantially closed compartment, cooperative recording electrodes carried in said compartment, two reels respectively a supply reel for holding a supply of tape and a feed reel for feeding the tape past said electrodes, means for coupling said motor to the feed reel to continuously rotate said reel, switch means within said casing connected in series with said electrodes, and means on said feed reel periodically actuating said switching means to cause said electrodes to mark time intervals on the tape as it is fed by said electrodes.

7. In the art of motor operated recording apparatus for marking electrosensitive tape, a magazine comprising a casing forming a substantially closed compartment, a removable insert in said compartment, cooperative recording electrodes mounted in juxtaposed relation on said insert, connector means mounted upon said insert so as to extend outside said casing for completing an auxiliary circuit to one of the electrodes so that the circuit can be readily interrupted and the electrodes and insert removed from the casing as an assembly, and two reels respectively for holding a supply of tape and for feeding the tape past said electrodes, switch means connected in series with another of said electrodes, and means on one of the reels periodically actuating said switching means, said auxiliary circuit causing said one electrode to mark external signals on said tape, and said switching means causing said other electrode to mark time intervals indicating the time of occurrence of said external signals.

8. In the art of recording apparatus for marking electrosensitive tape, a magazine comprising opposed separable cover plates having opposed inner walls and forming a compartment, recording electrodes carried in said compartment, and two reels respectively for holding a supply of tape and for feeding the tape past said recording electrodes, the inner wall of one of said plates having means radially engaging the reels to position the reels in the compartment, said inner walls being spaced substantially the depth of said reels and means for securing said plates together substantially to seal the compartment and hold the reels in engagement with the first said means, said recording electrodes comprising an anvil electrode and a disk rotatably and resiliently supported parallel to said inner walls in juxtaposition to said anvil electrode for resiliently pressing the tape against the anvil electrode.

9. In the art of motor operated recording apparatus for marking electrosensitive tape, a magazine comprising a casing having closely spaced, opposed inner walls and forming a substantially closed compartment, a removable insert member in said compartment including means for mounting cooperative recording electrodes in juxtaposed relation on said insert, so that electrodes and insert member may be removed from the casing as an assembly, two reel members respectively for holding a supply of tape and for feeding the tape past said electrodes, means laterally engaging at least one of said members to position it in the compartment, said inner walls being spaced substantially the depth of said one member to hold said one member in engagement with said engaging means, and said electrodes including an anvil electrode and a plurality of disks rotatably and resiliently mounted parallel to each other and to said inner walls and in marking relation to said anvil electrode whereby a plurality of parallel records may be marked on the tape between said walls.

References Cited in the file of this patent

UNITED STATES PATENTS

| | | |
|---|---|---|
| 1,124,820 | Simonsson | Jan. 12, 1915 |
| 1,309,413 | Hopkins | July 8, 1919 |
| 1,765,227 | Foust | June 17, 1930 |
| 1,820,088 | Parker | Aug. 25, 1931 |
| 2,118,896 | Pearlman et al | May 31, 1938 |

(Other references on following page)

UNITED STATES PATENTS

| | | |
|---|---|---|
| 2,212,970 | Finch | Aug. 27, 1940 |
| 2,333,321 | Leathers | Nov. 21, 1943 |
| 2,368,739 | Blain | Feb. 6, 1945 |
| 2,384,722 | Blain | Sept. 11, 1945 |
| 2,415,229 | Young | Feb. 4, 1947 |
| 2,421,673 | Young | June 3, 1947 |
| 2,428,369 | Kammer | Oct. 7, 1947 |
| 2,466,514 | Vagtborg | Apr. 5, 1949 |
| 2,524,564 | Gorham | Oct. 3, 1950 |
| 2,530,739 | Stamper | Nov. 21, 1950 |
| 2,540,081 | Alden | Feb. 6, 1951 |
| 2,557,196 | Nelson | June 19, 1951 |
| 2,659,653 | Owens | Nov. 17, 1953 |

FOREIGN PATENTS

| | | |
|---|---|---|
| 586,390 | Great Britain | Mar. 18, 1947 |